US00RE37240E

(19) United States
(12) Reissued Patent
Moore, Jr. et al.

(10) Patent Number: US RE37,240 E
(45) Date of Reissued Patent: Jun. 26, 2001

(54) WATER HEATER WITH REDUCED LOCALIZED OVERHEATING

(75) Inventors: H. Jack Moore, Jr., Playa Del Rey; Bijan Gidanian, Granada Hills, both of CA (US)

(73) Assignee: American Water Heater Company, Johnson City, TN (US)

(21) Appl. No.: 08/622,998

(22) Filed: Mar. 28, 1996

Related U.S. Patent Documents

Reissue of:
(64) Patent No.: 5,357,907
Issued: Oct. 25, 1994
Appl. No.: 08/166,729
Filed: Dec. 14, 1993

(51) Int. Cl.[7] ..... F22D 7/00
(52) U.S. Cl. ..... 122/406.1; 122/13.01; 122/14.1; 122/17.1; 122/402; 126/362
(58) Field of Search ..... 122/402, 403, 122/406.1, 406.5, 13.1, 14, 17; 126/362, 350 D, 351; 417/12, 144

(56) References Cited

U.S. PATENT DOCUMENTS 903,931 1/1908 Wiemann ..... 122/402
4,201,518 * 5/1980 Stevenson ..... 417/12
4,498,622 * 2/1985 Harnish ..... 126/362
4,541,410 * 9/1985 Jatana ..... 126/362
4,549,525 * 10/1985 Narang ..... 126/362
4,628,902 * 12/1986 Comber ..... 417/12
4,641,631 * 2/1987 Jatana ..... 126/362
4,750,472 * 6/1988 Fazekas ..... 417/12
4,766,883 * 8/1988 Cameron et al. ..... 122/17
4,790,289 * 12/1988 Barrett ..... 126/362
4,790,291 12/1988 Barrett ..... 126/362
4,869,232 * 9/1989 Narang ..... 126/362
5,022,352 * 6/1991 Osborne et al. ..... 122/17
5,179,914 * 1/1993 Moore, Jr. et al. ..... 122/13.1
5,347,956 * 9/1994 Hughes ..... 122/14

* cited by examiner

*Primary Examiner*—Teresa Walberg
*Assistant Examiner*—Gregory Wilson
(74) *Attorney, Agent, or Firm*—Schnader Harrison; Segal & Lewis LLP

(57) ABSTRACT

A water and/or space heater is provided in which water is circulated to prevent the localized overheating or vaporization thereof.

26 Claims, 3 Drawing Sheets

WATER HEATER WITH REDUCED LOCALIZED OVERHEATING

Matter enclosed in heavy brackets [ ] appears in the original patent but forms no part of this reissue specification; matter printed in italics indicates the additions made by reissue.

The present invention relates generally to water heaters and more particularly to a water heater which reduces localized overheating of water during heating.

BACKGROUND OF THE INVENTION

Highly fuel efficient gas burning water heaters are often provided with powered or forced draft combustion systems. Such combustion systems typically employ a blower for forcing the gas/air combustion mixture to the burner and into the combustion chamber of the heating appliance. High efficiency power assisted water heating appliances are disclosed in U.S. Pat. No. 4,766,683 to Cameron et al and in U.S. Pat. No. 5,085,579 to Moore, Jr. et al, which patents are assigned to the same assignee as that of the present application. The disclosures of U.S. Pat. Nos. 4,766,883 and 5,085,579 are incorporated herein by reference.

Moore 5,085,579 discloses a water heating apparatus in which a combustible gas/air mixture is introduced into a blower which moves the mixture under pressure into a vertically extending tubular burner within a closed combustion chamber contained within a tank containing water. The products of combustion exit the combustion chamber and pass through a helical tube of several turns within the body of water. The heat of combustion is extracted from the products of combustion by conduction through the walls of the combustion chamber and the helical exhaust tube. A high efficiency water heater thereby results.

The heated water from the water heater may alternatively be used to heat the air of a home or building by piping the hot water to a heat exchanger contained within the ducts of the home ventilation or heating system.

Large amounts of energy can be generated by burning a pressurized mixture of fuel and air. Furthermore, as the burner and exhaust tubes are almost entirely surrounded by water to be heated, most of the energy generated by the burner is quickly transferred to the surrounding water. While this configuration results in a highly efficient water heater, it can also create problems which decrease the theoretical efficiency of the system.

Heat flows so rapidly from the burner and exhaust tubing to the surrounding water that some regions within the tank may be heated to a higher temperature than is called for before a thermostat can deactivate the burner. In some cases, the heat may be sufficient to vaporize portions of the water resulting in the generation of steam. Overheating the water is inefficient because extra fuel is consumed to heat the water to an excessive temperature. It can also cause noise as small bubbles of vapor form and collapse. Moreover, when steam is produced, it must be vented to prevent pressure from building up within the tank. This releases energy to the surroundings which could have been used to heat water. The overheating and vaporization of water both prevent a forced draft combustion system from operating at its maximum efficiency.

These problems are aggravated by the fact that the hottest water in a water tank is located near the top of the tank and lower temperature water forms a layer near the tank bottom due to the difference of densities of hot and cold water. This is normally a desirable occurrence for it allows hot water to be drawn from the top of the tank without being mixed with colder water from the supply line.

A high capacity burner of the type contemplated herein can heat cold water rapidly enough to overheat or even vaporize a portion of the water in the tank.

The rate at which hot water is drawn from the tank determines the rate at which cool water in the tank must be heated and, hence the amount of energy that the burner must produce. If the water in the tank is heated too quickly, regions of water in the tank may overheat or vaporize. If the water is heated too slowly, hot water will not be available to replace the water being withdrawn from the tank. Thus, a water heater used to supply large quantities of hot water must heat water more rapidly than a water heater which is required to produce a lesser quantity of hot water. A purchaser of a water heater should, accordingly, select a model adequate to supply maximum normal hot water requirements.

Water heaters are generally available in a limited number of different sizes. This often means obtaining an overcapacity model that heats water at a faster rate than needs require. Use of a water heater which heats water more quickly than necessary to replace hot water being used can contribute to the overheating and vaporization problems mentioned above. It is not practical, however, to stock dozens of different models each suited to a narrow range of supply rates; therefore, the inefficiencies associated with using a system which heats at too high a rate have been impractical to avoid.

OBJECTS OF THE INVENTION

It is an object of the present invention to provide a water heater of the power assisted type which prevents portions of water within a tank from being overheated or vaporized.

It is another object of the present invention to provide a water heater which reduces the negative effects of temperature layering within a tank.

It is another object of the present invention to provide an efficient water heater which avoids overheating or vaporizing water within a tank without requiring substantially more energy to operate than other water heating apparatuses.

These and other objects and advantages of the invention will become apparent from the following detailed description when read in conjunction with the drawing.

SUMMARY

The invention is directed to a new and improved apparatus which overcomes these problems and provides a gas-burning water heater which minimizes overheating and/or vaporization of water in the tank.

A water heating apparatus is provided including a small pump which circulates water within the tank when the burner is activated so that any water separated into layers of different temperature will be mixed. The circulating pump operates only when the burner is in operation to take advantage of the benefits of mixing of hotter and colder layers. Thus, when heat flows into the water from the burner and combustion gas exhaust tube, the water circulates in response to activation of the burner to prevent uneven heating. The burner can then generate more heat without vaporizing the water.

When the burner is not in operation, the circulating pump is disengaged and the hottest water tends to rise toward the top of the tank where it can be drawn off in the usual manner. There is less danger of overheating than in prior water heaters because substantially less heat flows from the burner and exhaust tube to the water when the burner is off. Moreover, because the circulating pump only moves water from place to place in the tank, it need not be very powerful and does not contribute significantly to the amount of energy used by the water heater.

DETAILED DESCRIPTION OF THE INVENTION

Figure 1:
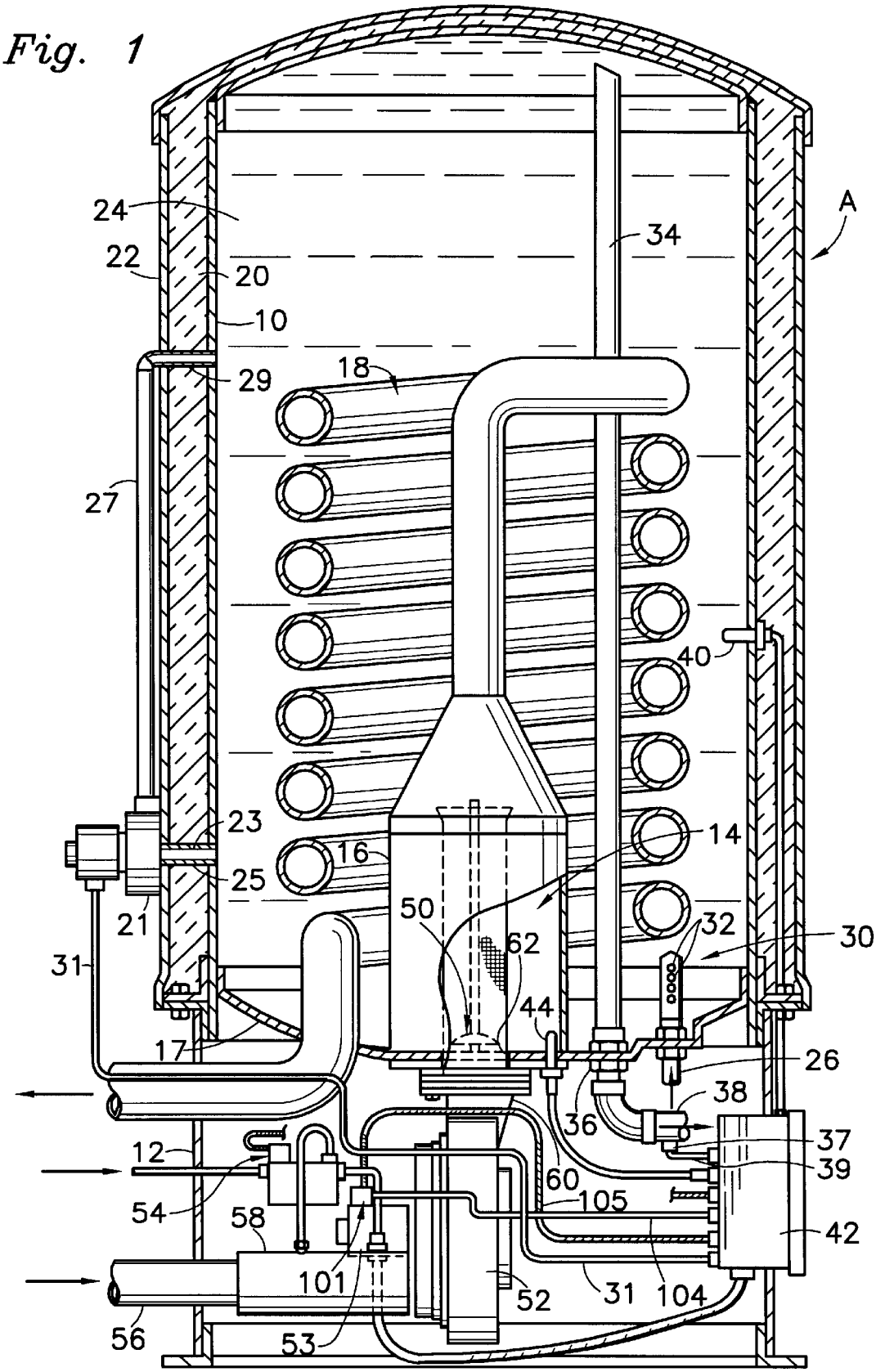
FIG. 1 is a side elevational view partially in vertical section, of a water heater utilizing the invention and showing major elements thereof.

Referring now to FIG. 1 wherein the structures and steps shown are for the purpose of illustrating preferred embodiments of the invention only and not for the purposes of limiting same, FIG. 1 shows a water heater A including a water tank 10 supported in an upright position upon a cylindrical base 12. A combustion chamber 14 is located at the bottom of tank 10 and defined in part by an upstanding steel cylindrical wall 16 having a steel exhaust gas exit tube 18 at its top. The water tank 10 is surrounded by a layer of insulation 20 and a protective jacket 22 in the conventional manner.

When water heater A is in use, with the burner inactivated, tank 10 normally contains stratified body of water 24 with the coldest water remaining in the bottom portion of the tank and the hottest water having risen to the top portion. The water to be heated is introduced into water tank 10 through inlet piping 26 leading through bottom steel plate 17 of tank 10 and feeding water to an inlet water diffuser 30. Diffuser 30 is a short, closed steel tube secured within tank 10 to bottom plate 17 thereof in a vertical orientation and having apertures 32 along one of its side surfaces through which water is introduced into the tank near its bottom.

Heated water is withdrawn from tank 10 through an outlet tube 34 which is fixed to a fitting 36 penetrating through bottom plate 17 of tank 10 and extends upwardly to the topmost region of tank 10. The top of outlet tube 34 is open. Heated water passes through this top end opening into tube 34 and downwardly therethrough and out of tank 10 and into a hot water outlet 38.

Inlet piping 26 and hot water outlet 38 may be connected to the domestic water piping of the building in which the water heater A is disposed, thereby supplying hot water. Inlet piping 26 and hot water outlet 38 may also be connected through appropriate valves to a heat exchanger in a space heating and ventilating system to provide heat for the building in accordance with the teachings of the aforementioned Cameron et al U.S. Pat. No. 4,766,883 and Jantana U.S. Pat. No. 4,451,410.

Heat is provided to the body of water 24 from the heat of fuel combustion in combustion chamber 14. The equipment and method of supplying combustion gases to combustion chamber 14 is described hereinafter with reference to a system using natural gas as the input energy source. Other fuels, such as bottled propane gas and the like can be used with only slight adjustments to the system easily accomplished by those skilled in the art. Both hot water for domestic use and interior space heating may be provided by a single heater such as described herein and in the above mentioned U.S. Patents to Cameron et al and Jantana.

When hot water is withdrawn from tank 10 through outlet tube 34, additional cold water is admitted into the tank through inlet water diffuser 30. When sufficient cold water is drawn into tank 10, the temperature drop of the water 24 is sensed by a [sensor] *thermostat* 40 connected to electric control circuitry contained in an electrical control box 42. Appropriate control circuitry is well known in the art and will not be described in detail herein.

Figure 2:
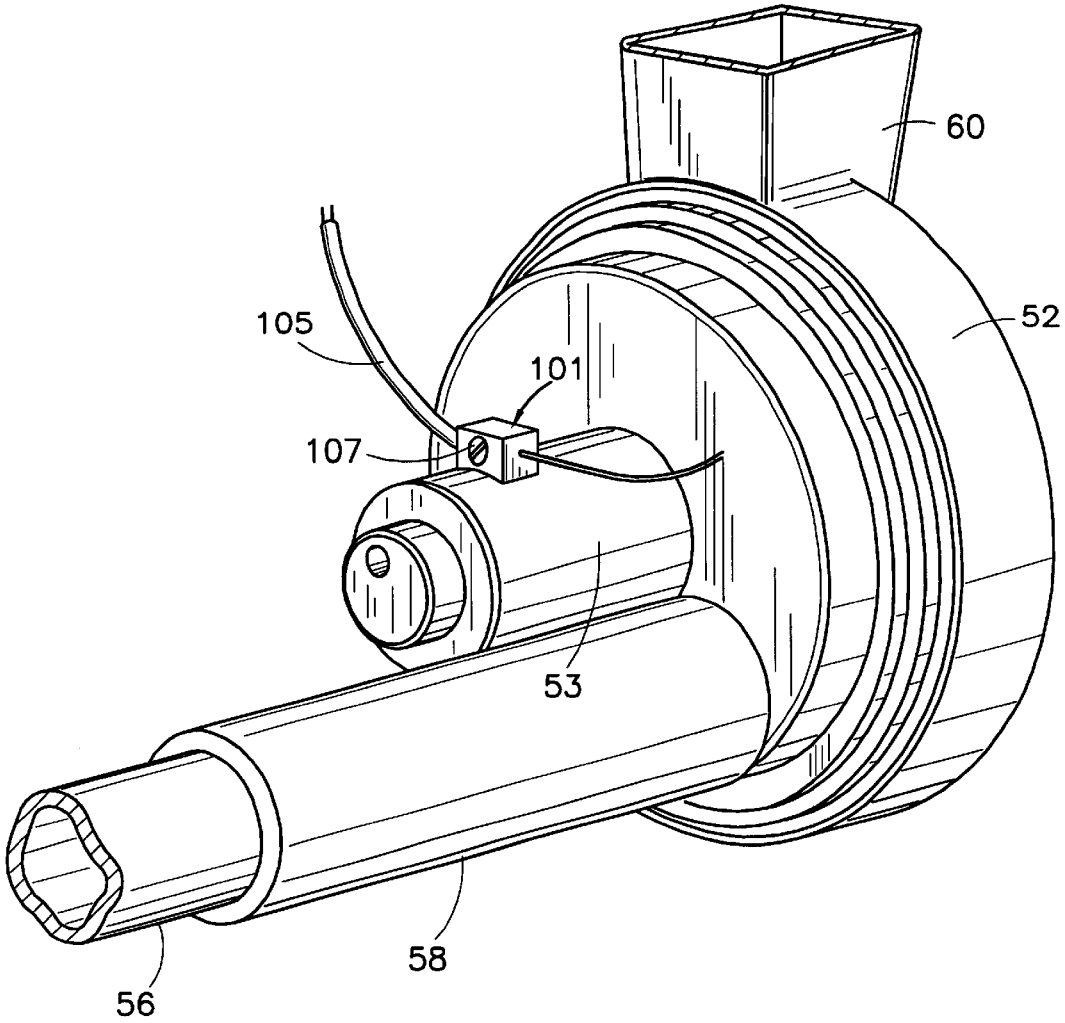
FIG. 2 is a perspective view of a blower from the water heater shown in FIG. 1.

In response to the [sensor] *thermostat* 40, an electric igniter 44 located within bottom region of combustion chamber 14 is energized. The igniter quickly ignites a gas and fuel mixture introduced into combustion chamber 14 from a burner 50 located therein. A blower 52 is energized and a fuel regulator 54 is turned on. Blower 52, shown in FIG. 2 draws air from outside the water heater or the vehicle through air inlet tubing 56 into an air and fuel proportioner 58, as described in the above-mentioned Cameron et al U.S. Patent, where fuel is introduced to the air stream and some mixing occurs. The air and fuel mixture is drawn into the body of blower 52 where it is pressurized and mixed further. A homogeneous air and fuel mixture results. This mixture is burned in burner 50 to heat the water in tank 10. The combustion products are vented through exhaust tubing 18 and out of water heater A. Exhaust tubing 18 winds through the water in tank 10 so that heat from the exhaust gases is transferred to the water.

To substantially prevent regions within tank 10 from being overheated when burner 50 is activated, water heater A further includes a pump 21 adapted to circulate water 24 within tank 10. Pump 21 is activated through a cable 31 extending from control box 42 which is responsive to a sensor 37 located in hot water outlet 38, which controls the activation of pump 21 in response to temperature or flow rate of the outgoing hot water.

Pump 21 is shown attached to jacket 22. However, it is often preferred to mount pump 21 below tank 10. With pump 21 mounted on the side of the tank 10, a lower tube 23 passes through a lower opening 25 and connects pump 21 to the body of water 24 inside tank 10. An upper tube 27 connects to pump 21, runs alongside jacket 22, passes through an upper opening 29 connecting pump 21 to the body of water 24 within tank 10. Upper tube 27 may also be positioned between tank 10 and jacket 22 or elsewhere.

When the pump 21 is located below the tank 10, lower tube 23 and upper tube 27 may both be arranged to penetrate through the bottom of tank 10. Lower tube 23 terminates near the bottom of tank 10 and upper tube 27 terminates near the top of tank 10. The tubes and pump are thereby protected within the water heater structure.

Pump 21 is, as stated, connected to electrical control box 42 by line 31 and is activated whenever blower 52 is energized. This causes the water from tubes 23, 27 and 29 to remove and re-introduce water from and into tank 10 to circulate the tank water and minimize the likelihood that portions of the body of water 24 will be overheated. It is also possible for pump 21 to be activated in other ways such as when burner 50 is activated, when [sensor] *thermostat* 40 transmits a desired signal, when fuel regulator 54 is turned on, and the like. It will be appreciated that moving water from one point to another within a tank of water requires little energy and that only a small pump is needed.

Blower 52 is one in which the air and fuel intake is near the center portion of the blower body and the output is on the outer periphery of the blower. The pressurized and homogenized air and fuel mixture from blower 52 is directed through output horn 60 of the blower and into the open bottom end of burner 50 within combustion chamber 14 through a circular burner inlet opening 62 centrally located in bottom plate 17 of tank 10.

Figure 3:
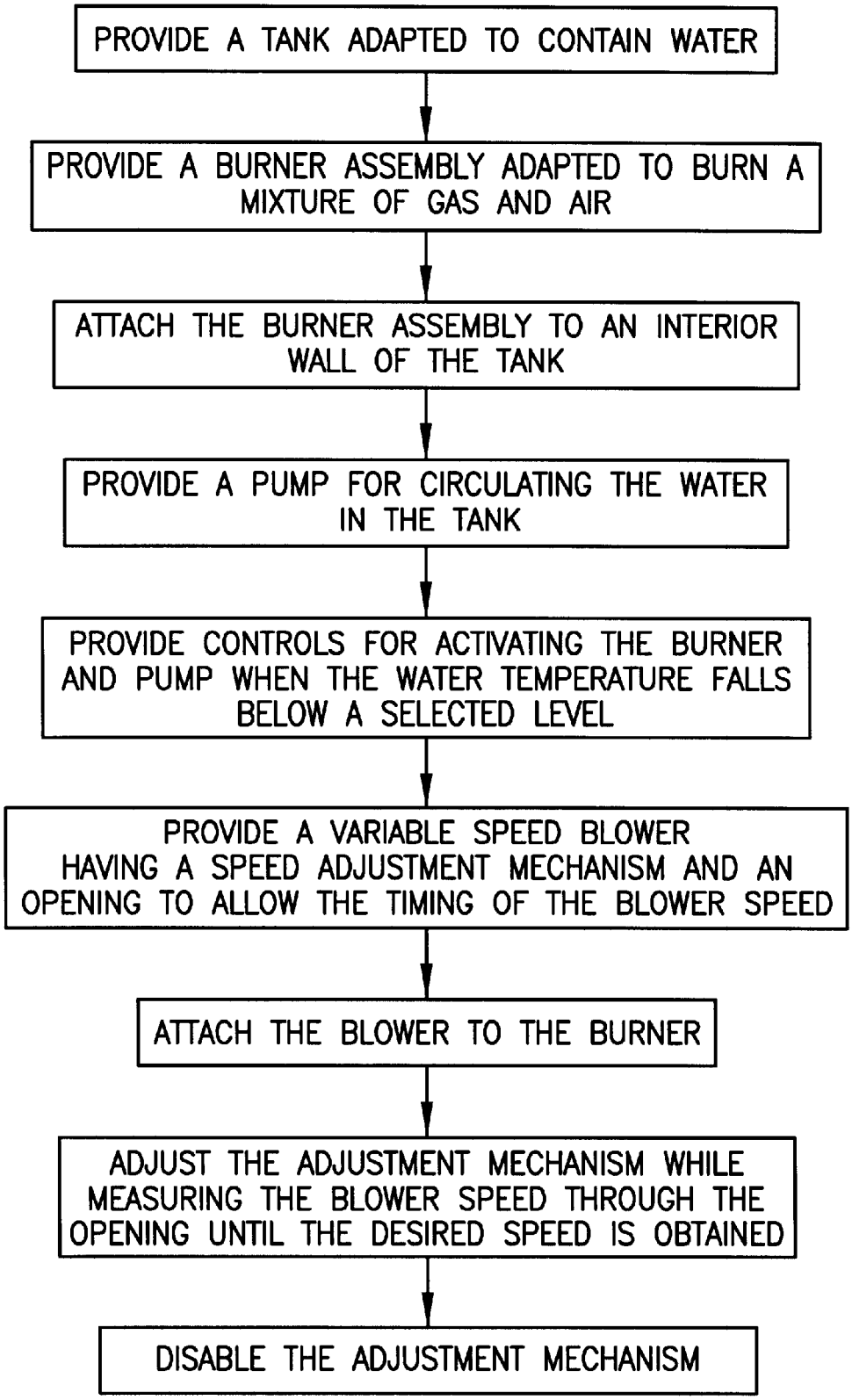
FIG. 3 is a flow diagram reciting steps for production of a water heater.

Blower 52 is powered by a motor 53. Motor 53 includes a speed control 101 in series with power supply line 105. Preferably, blower 52 is a variable speed blower wherein the resistance is varied by an adjusting screw 107. Varying the resistance in power line 105 varies the voltage supplied to motor 53 which in turn affects the speed of blower 52 and the amount of fuel supplied to burner 50. The speed of motor 53 can be accurately set at the factory during assembly of water heater A as shown in FIG. 3 while monitoring the motor speed through an opening in the motor cover using a standard strobe timing light. In this manner, the heat generated by burner 50 can be accurately controlled so that the overheating and vaporization problems mentioned above are minimized.

A high capacity pump could be used instead of pump 21 to rapidly circulate the water in tank 10 and partially compensate for the use of an unnecessarily large burner. Rapidly moving water spends less time in contact with the extreme heat of burner 50 and is, therefore, less likely to be overheated or vaporized. A pump sufficiently powerful to circulate water in this manner, however, has increased energy requirements that decrease the efficiency of the system. Conversely, the rate at which burner 50 heats the water can be reduced to reduce overheating. This, however, results in a lower output of hot water.

It sill, therefore, be appreciated that by utilizing a small circulating pump, the problems of overheating and vaporization are greatly reduced without significantly altering the energy requirements of the water heater. The small pump 21 preferred herein may be of any number of types and designs so long as it performs the task of adequately circulating water from and into tank 10 in the vicinity of the hot metal surfaces of combustion chamber 14 and exhaust tubing 18.

In another embodiment, the rate at which burner 50 heats water 24 may be varied to correspond to the rate at which hot water is drawn from tank 10 through outlet tube 34 and hot water outlet 38. When large amounts of hot water are being drawn from tank 10, the blower speed may be increased to provide more fuel and air to burner 50. This causes the incoming cold water to be heated rapidly. Because of the large amount of cold water entering tank 10 when hot water is being drawn off rapidly, overheating may not be a significant problem. When little or no hot water is being withdrawn, the blower speed may be decreased so that burner 50 heats the surrounding water more slowly.

The proper blower speed is determined by monitoring either the flow rate of water passing through hot water outlet 38 or the temperature of the water, or both. A [sensor] *thermostat* 37 in hot water outlet 38 provides information on temperature or flow rate to control box 42 through a cable 39. When the withdrawal rate of hot water is high, control box 42 signals speed control 101 through a cable 104 to increase the blower speed. When less hot water is being withdrawn, the blower speed is decreased to avoid overheating the water. In a similar manner, [sensor] *thermostat* 37 may be adapted to sense the temperature of the water in outlet 38. When the temperature sensed by [sensor] *thermostat* 37 falls below the water temperature which tank 10 is intended to provide, control box 42 signals speed control 101 to increase the blower speed and heat the water more rapidly. When the water in the hot water piping rises above a preset temperature, the blower speed is decreased to prevent overheating. In conjunction with temperature [sensor] *thermostat* 40, which signals control box 42 to turn burner 50 on and off based on the temperature of the water in tank 10, [sensor] *thermostat* 37 facilitates the production of hot water having a consistent temperature.

From the above description, it will be evident that we have provided an improved water heater which minimizes or prevents localized overheating and vaporization of water within the tank and thereby increases the efficiency of the water heater.

While the apparatus has been described herein for particular use in a water heater, it should be understood that it may be employed as well in other devices in which localized overheating of water is a problem. Further, water inlets and outlets may be relocated to various positions on tank 10, a single vertically oriented flue extending through the length of tank 10 may be used; various form of blower and locations of blowers may be employed, as well. Equivalent elements may be substituted for those selected for illustration in the drawings, and parts and directions of water flow may be reversed, and certain features of the invention may be used independently of other features, all without departing from the spirit and scope of the invention, which is defined in the appended claims.

We claim:

1. A water heater comprising a water tank, a burner adapted to heat the water within said tank, a water inlet, a water outlet and water circulating means independent of said inlet and said outlet and connected to circulate the water in said tank responsive to activation of said burner for increasing uniformity of water temperature at different locations up and down said tank.

2. A water heater according to claim 1, wherein said burner comprises a combustion chamber adapted to burn a mixture of fuel and air and including a blower adapted to force said mixture into said combustion chamber.

3. A water heater according to claim 1 in which said circulating means includes a circulating pump connected at different locations in said tank to circulate the water within said tank.

4. A water heater according to claim 3 including a thermostat for activating said burner and said circulating pump when the temperature of the water in said tank is below a predetermined level.

5. A water heater according to claim 4 in which control means are provided and connected wherein said pump is activated only when said burner is activated.

6. A water heater according to claim 3 in which said circulating pump is located exteriorly of said tank.

7. A water heater comprising a water tank, a water inlet, a water outlet, a burner adapted to burn a mixture of gas and air to heat the water within said tank and having a heat output, water circulating means independent of said inlet and outlet and connected to circulate the water in said tank in response to activation of said burner, and means for adjusting the heat output of said burner.

8. An apparatus according to claim 7 including a thermostat adapted to activate said burner and said circulating pump when the temperature of said water is below a preselected level.

*9. A water heater comprising a water tank, a burner adapted to heat water within said tank, a water inlet, a water outlet and water circulating means connected to said tank to circulate water in said tank responsive to activation of said burner for increasing uniformity of water temperature at locations up and down said tank.*

*10. A water heater according to claim 9 in which said circulating means includes a circulating pump connected at different locations in said tank to circulate the water within said tank.*

*11. A water heater according to claim 9 including a thermostat for activating said burner and said circulating pump when the temperature of the water in said tank is below a predetermined level.*

*12. A water heater comprising a water tank, a burner adapted to heat water within said tank, a blower adapted to assist in venting combustion products generated by said burner, a water inlet, a water outlet and water circulating means connected to said tank to circulate water in said tank responsive to activation of said blower for increasing uniformity of water temperature at locations up and down said tank.*

*13. A water heater according to claim 12 in which said circulating means includes a circulating pump connected at different locations in said tank to circulate the water within said tank.*

*14. A water heater according to claim 12 including a thermostat for activating said burner and said circulating pump when the temperature of the water in said tank is below a predetermined level.*

*15. A water heater comprising a water tank, a burner adapted to heat water within said tank, a water inlet, a water outlet, a sensor adapted to detect the temperature of water in said water outlet and water circulating means connected to said tank to circulate water in said tank responsive to said sensor for increasing uniformity of water temperature at locations up and down said tank.*

*16. A water heater according to claim 15 in which said circulating means includes a circulating pump connected at different locations in said tank to circulate the water within said tank.*

*17. A water heater according to claim 15 including a thermostat for activating said burner and said circulating pump when the temperature of the water in said tank is below a predetermined level.*

*18. A water heater comprising a water tank, a thermostat adapted to detect the temperature of water in said tank, a burner adapted to heat said water, a water inlet, a water outlet and non-heated water circulating means connected to said tank to circulate water in said tank responsive to said thermostat for increasing uniformity of water temperature at locations up and down said tank.*

*19. A water heater according to claim 18 in which said circulating means includes a circulating pump connected at different locations in said tank to circulate the water within said tank.*

*20. A water heater according to claim 18 where said burner and said circulating pump are activated in response to said thermostat when the temperature of the water in said tank is below a predetermined level.*

*21. A water heater comprising a water tank, a burner adapted to heat water within said tank, a fuel regulator connected to said burner, a water inlet, a water outlet and water circulating means connected to said tank to circulate water in said tank responsive to activation of said fuel regulator for increasing uniformity of water temperature at locations up and down said tank.*

*22. A water heater according to claim 21 in which said circulating means includes a circulating pump connected at different locations in said tank to circulate the water within said tank.*

*23. A water heater according to claim 21 including a thermostat for activating said burner and said circulating pump when the temperature of the water in said tank is below a predetermined level.*

*24. A water heater comprising a water tank, a water inlet, a water outlet, a burner adapted to burn a mixture of gas and air to heat the water within said tank and having a heat output, water circulating means and connected to circulate the water in said tank in response to activation of said burner, and means for adjusting the heat output of said burner.*

*25. A water heater according to claim 24 in which said circulating means includes a circulating pump connected at different locations in said tank to circulate the water within said tank.*

*26. A water heater according to claim 24 including a thermostat for activating said burner and said circulating pump when the temperature of the water in said tank is below a predetermined level.*

* * * * *